(12) United States Patent
Kieselhorst

(10) Patent No.: US 7,790,990 B2
(45) Date of Patent: Sep. 7, 2010

(54) COMBINATION WEIGHER WITH PERIPHERAL ANNULAR RECYCLING TABLE

(75) Inventor: Ralph Kieselhorst, Saukville, WI (US)

(73) Assignee: Yamato Corporation, Colorado Springs, CO (US)

( * ) Notice: Subject to any disclaimer, the term of this patent is extended or adjusted under 35 U.S.C. 154(b) by 0 days.

(21) Appl. No.: 12/261,836

(22) Filed: Oct. 30, 2008

(65) Prior Publication Data

US 2010/0108404 A1    May 6, 2010

(51) Int. Cl.
    *G01G 19/387* (2006.01)
(52) U.S. Cl. .................................... 177/25.18
(58) Field of Classification Search .............. 177/25.18, 177/90, 91
    See application file for complete search history.

(56) References Cited

U.S. PATENT DOCUMENTS

| | | | | |
|---|---|---|---|---|
| 4,666,002 A | * | 5/1987 | Haze ............................. | 177/1 |
| 4,967,856 A | * | 11/1990 | Kawanishi et al. ......... | 177/25.18 |
| 5,048,623 A | * | 9/1991 | Toyoda ..................... | 177/25.18 |
| 5,753,867 A | * | 5/1998 | Konishi et al. ............ | 177/25.18 |
| 5,813,195 A | * | 9/1998 | Nielsen et al. ............. | 53/443 |
| 6,066,810 A | * | 5/2000 | Simionato ................. | 177/25.18 |
| 7,063,215 B2 | * | 6/2006 | Baranowski ................ | 209/592 |
| 2010/0108405 A1 | * | 5/2010 | Kieselhorst ............... | 177/25.18 |

FOREIGN PATENT DOCUMENTS

JP    2528432    12/1996

* cited by examiner

*Primary Examiner*—Randy W Gibson
(74) *Attorney, Agent, or Firm*—Marshall, Gerstein & Borun LLP

(57) ABSTRACT

A combination weigher of the present invention comprises a plurality of weighing hoppers which are arranged in a circular shape and are each configured to discharge the products selectively in one of two directions, a collecting chute which is configured to gather the products which have been discharged from the weighing hopper in the inward direction and to discharge the products, a recycle conveyor configured to convey the products which have been discharged from the weighing hoppers in the outward direction and have been loaded onto the recycle conveyor, a discharge means which is configured to discharge the products from the recycle conveyor; a combination calculation means which is configured to determine a discharge combination, a recycle hopper determination means configured to determine a weighing hopper whose products should be recycled, and a control means configured to cause the weighing hoppers selected to form the discharge combination to discharge the products in the inward direction, and to cause the weighing hopper determined by the recycle hopper determination means to discharge the products in the outward direction.

9 Claims, 7 Drawing Sheets

COMBINATION WEIGHER WITH PERIPHERAL ANNULAR RECYCLING TABLE

BACKGROUND OF THE INVENTION

1. Field of the Invention

The present invention relates to a combination weigher which includes weighing hoppers arranged in a circular shape and feeds to a packaging machine or the like products which have been weighed.

2. Description of the Related Art

Typically, products which have been weighed by a combination weigher are fed to, for example, a packaging machine, and are charged into packaging bags or packaging containers. Such a combination weigher which weighs the products is configured to include weighing hoppers arranged in a circular shape or weighing hoppers arranged in a linear shape. In these configurations, for example, below the weighing hoppers, a collecting chute is disposed to gather the products which have been discharged from the weighing hoppers and to discharge the products from a discharge outlet provided at a bottom part thereof to a packaging machine or the like. In the configuration in which the weighing hoppers are arranged in a circular shape, the distances between the weighing hoppers and the discharge outlet of the collecting chute can be made equal. However, in the configuration in which the weighing hoppers are arranged in a linear shape, the distances between the weighing hoppers and the discharge outlet of the collecting chute are different. For this reason, the configuration in which the weighing hoppers are arranged in a circular shape is more preferable than the configuration in which the weighing hoppers are arranged in a linear shape, because it can reduce a difference in a time taken to accomplish the operation in which the products start to be discharged from weighing hoppers selected to form a discharge combination, slide down on the collecting chute, and are discharged from the discharge outlet thereof, and this can attain a high-speed operation. Hereinafter, the combination weigher including the weighing hoppers arranged in a circular shape will be described.

In the conventional combination weigher in which the weighing hoppers are arranged in a circular shape, for example, a dispersion feeder having a substantially conical shape is disposed at an upper part of a center of the combination weigher and a plurality of linear feeders are arranged radially around the dispersion feeder. Below the plurality of linear feeders, a plurality of feeding hoppers are arranged in a circular shape. Below the feeding hoppers, a plurality of weighing hoppers are arranged in a circular shape. Below the plurality of weighing hoppers, a collecting chute is provided to gather the products which have been discharged from the weighing hoppers and to feed the products to, for example, a feed inlet of a packaging machine. For example, a supplying device supplies the products to a center part of the dispersion feeder, which vibrates to transfer the products to the linear feeders. Each linear feeder vibrates to transport the products and feeds them to the feeding hopper. Each feeding hopper temporarily holds the products and feeds the products to the weighing hopper located therebelow. Each weighing hopper weighs the products which have been fed thereto. Combination calculation is performed based on measured values to determine one combination of weighing hoppers in which a total of the measured values falls within an allowable range with respect to a target combination weight and to determine it as a combination (hereinafter referred to as a "discharge combination") for discharging the products. The weighing hoppers selected to form the discharge combination discharge the products. The discharged products slide down on the collecting chute and are fed into, for example, the feed inlet of the packaging machine.

U.S. Pat. No. 6,066,810 (hereinafter referred to as a "patent document 1") discloses that, instead of the collecting chute, a belt conveyor is provided to receive products which have been discharged from hoppers selected to form a discharge combination and to gather the products which should be fed to a packaging machine.

Japanese Utility Model Application Registered No. 2528432 (hereinafter referred to as "document 2") discloses that, instead of the collecting chute, a gutter-shaped conveyor guide member is disposed below weighing hoppers to receive products which have been discharged from weighing hoppers selected to form a discharge combination, a conveyor board movable within the conveyor guide member is provided, and the conveyor board moves to sweep the products from inside of the conveyer guide member to a discharge outlet provided in a predetermined location of the conveyor guide member.

The configuration in which the collecting chute is provided is more preferable than the configuration in which the belt conveyor is provided as disclosed in document 1 or the configuration in which the gutter-shaped conveyor guide member and the conveyor board are provided as disclosed in patent document 2, because a time taken to accomplish the operation in which the products start to be discharged from the hoppers selected to form the discharge combination, are gathered and are discharged to the packaging machine is shorter, achieving a higher-speed operation.

In the above described combination weigher, in the case of, for example, products which have a tendency to stick together, they sometimes stick together and are fed from the linear feeder to the feeding hopper with a large amount at a time. In this case, a large amount of products are fed from the feeding hopper to the weighing hopper. For example, a weighing hopper which is fed with the products with an amount that is larger than an upper limit value of an allowable range with respect to the target combination weight, is not selected for the discharge combination. In a case where favorable combination weighing accuracy is attained by setting the number of weighing hoppers selected to form the discharge combination to four in average, the operation is set so that a target feed amount for the weighing hopper is ¼ or substantially ¼ of the target combination weight. It is difficult to select for the discharge combination the weighing hopper which is fed with the products whose amount is significantly larger than the target feed amount, for example, twice as large as the target feed amount. This is because, if such a weighing hopper participates in a combination within a predetermined weight range, then the number of other weighing hoppers which can participate in the combination becomes smaller.

In a case where a package containing a predetermined number of products is manufactured, a combination of weighing hoppers in which a total weight of the products falls within the allowable range with respect to the target combination weight and a total number of the products is a predetermined number is determined as the discharge combination. In this case, when the products are fed with a large amount at a time from the linear feeder to the feeding hopper and the products whose number is larger than the predetermined number are fed from the feeding hopper to the weighing hopper as described above, this weighing hopper is not selected for the discharge combination. In a case where favorable combination weighing accuracy is attained by setting the number of weighing hoppers selected to form the discharge combination to four in average and a package containing a smaller number, for example, seven pieces of products is manufactured, each weighing hopper must be configured to be fed with one to two pieces of products. For example, if a weighing hopper is fed with eight pieces of products, then the weighing hopper is not selected for the discharge combination.

If the weighing hopper which is fed with the products with an excess amount (hereinafter referred to as an "excess product weighing hopper") as described above increases in number, then it becomes impossible to determine the discharge combination. Accordingly, to eliminate the excess product weighing hopper, the products must be discharged from the excess product weighing hopper. In an example of a method for achieving this, a combination weigher is operated in such a manner that the excess product weighing hopper is displayed on a screen of a display device equipped in the combination weigher and an operator removes the products from the excess product weighing hopper. To this end, manual intervention is required to remove the products from the excess product weighing hopper and a productive capacity is reduced.

In another example of the method, for example, a collecting hopper capable of discharging the products to be weighed in two directions is provided at a discharge outlet of the collecting chute, and a first chute is provided to route to the feed inlet of the packaging machine the products which have been discharged in one direction from the collecting hopper, while a second chute is provided to route to a specified discharge area the products which have been discharged in the other direction from the collecting hopper. In this case, the products which have been discharged from the weighing hopper selected to form the discharge combination are held in the collecting hopper and then are discharged to the first chute. On the other hand, the products which have been discharged from the excess product weighing hopper are held in the collecting hopper and then are discharged to the second chute. When the products are discharged from the excess product weighing hopper, the weighing hopper selected to form the discharge combination must stop discharging for a moment, causing a reduced productive capacity.

SUMMARY OF THE INVENTION

The present invention has been made with a view to solving the above described problem, and an object of the present invention is to provide a combination weigher which is capable of discharging products from a weighing hopper which is not selected for a discharge combination and from a weighing hopper which is difficult to select for the discharge combination, without manual intervention and without reducing a productive capacity.

With a view to achieving the above objective, a combination weigher of the present invention comprises a plurality of weighing hoppers which are arranged in a circular shape and are each configured to hold products, and then to discharge the products selectively in an inward direction of the circular shape or in an outward direction of the circular shape, the weighing hoppers being each configured to measure weight of the products which are held therein; a collecting chute which is positioned below the weighing hoppers, the collecting chute being configured to gather the products which have been discharged from the weighing hopper in the inward direction and to discharge the products from a discharge outlet at a bottom part thereof; a recycle conveyor which is positioned below the weighing hoppers so as to surround the collecting chute, the recycle conveyor being configured to convey, in one direction around the collecting chute, the products which have been discharged from the weighing hopper in the outward direction and have been loaded onto the recycle conveyor; a discharge means which is configured to discharge the products on the recycle conveyor in a predetermined position from the recycle conveyor; a combination calculation means which is configured to determine a discharge combination which is a combination of weighing hoppers holding the products whose total weight falls within a predetermined weight range; a recycle hopper determination means configured to determine a weighing hopper whose products should be recycled, based on a predetermined recycle condition; and a control means configured to cause the weighing hopper selected to form the discharge combination to discharge the products in the inward direction, and to cause the weighing hopper determined by the recycle hopper determination means to discharge the products in the outward direction.

In accordance with such a configuration, the products which have been discharged in the inward direction from the weighing hopper selected to form the discharge combination are discharged onto the collecting chute and are fed into, for example, a feed inlet of the packaging machine, from the discharge outlet of the collecting chute. On the other hand, the products which have been discharged from the weighing hopper which is determined by the recycle hopper determination means based on the predetermined recycle condition are discharged onto the recycle conveyor and are discharged from a predetermined position of the recycle conveyor. For example, the predetermined recycle condition is set such that the weight of the products which are held in the weighing hopper is a predetermined weight or larger. Under the condition, the weighing hopper which is fed with the products with an excess amount and is not selected for the discharge combination or is difficult to select for the discharge combination, is determined, so that the products can be discharged from these weighing hoppers via the recycle conveyor. That is, by providing the recycle conveyor and configuring the weighing hopper so that it is capable of discharging the products selectively to the collecting chute or to the recycle conveyor, the products can be discharged from the weighing hopper which is not selected for the discharge combination or from the weighing hopper which is difficult to select for the discharge combination via the recycle conveyor, without manual intervention and without reducing a productive capacity.

The combination weigher may further comprise a dispersion feeder configured to disperse the products which have been supplied to a center portion thereof toward a peripheral edge thereof; a plurality of linear feeders which are arranged radially around the dispersion feeder, the linear feeders being each configured to convey, in a direction away from the dispersion feeder, the products which have been fed from the dispersion feeder, and to discharge the products; a plurality of feeding hoppers which are arranged in a circular shape above the weighing hoppers, and are configured to hold the products which have been discharged from the linear feeders and to then feed the products to the weighing hoppers; and a transport means of the products which is configured to feed, to the dispersion feeder, the products which have been discharged from the recycle conveyor by the discharge means.

In accordance with such a configuration, the products which have been discharged from the recycle conveyor can be fed to the dispersion feeder again without manual intervention.

The recycle conveyor may include a rotary table of a circular-ring shape onto which the products are loaded, the rotary table being rotatable around a vertical axis extending through a center of the circular shape in which the weighing hoppers are arranged. The discharge means may include a guide plate which guides, to outside the rotary table, the products on the rotary table which is rotating.

In accordance with such a configuration, the recycle conveyor can be simply constituted using the rotary table of the circular-ring shape, and the discharge means can be simply constituted using the guide plate.

The combination weigher may further comprise an inner guide plate which is configured to guide, to an inner edge portion of the rotary table, the products which have been discharged from the weighing hoppers in the outward direction.

The inner guide plate enables the products which have been discharged from the weighing hopper to be guided smoothly onto the rotary table.

The combination weigher may further comprise an outer guide plate provided to extend along an outer edge portion of the rotary table.

The outer guide plate is able to prevent the products from being ejected from the rotary table to outside.

The predetermined recycle condition may be such that a weight of the products which are held in the weighing hopper has a predetermined weight value or larger which is larger than a target feed amount for the weighing hopper.

In this case, the weighing hopper holding the products whose weight is not smaller than the predetermined weight value is determined as the weighing hopper whose products should be recycled. In this case, by setting the predetermined weight value to an appropriate value, for example, a value that is twice as large as the target feed amount for the weighing hopper, it is possible to determine the weighing hopper which is not selected for the discharge combination or the weighing hopper which is difficult to select for the discharge combination, as the weighing hopper whose products should be recycled.

The predetermined recycle condition may be such that a weight of the products which are held in the weighing hopper has a value that is larger than an upper limit value in the predetermined weight range.

In this case, the weighing hopper which is fed with the products with an excess amount and therefore is not selected for the discharge combination is determined as the weighing hopper whose products should be recycled.

The combination calculation means may be configured to determine a discharge combination which is a combination of the weighing hoppers which hold the products whose total weight falls within a predetermined weight range and whose total number is a target number. The recycle hopper determination means may be configured to determine that the predetermined recycle condition is such that the number of the products which are held in the weighing hopper is a predetermined number or larger.

In this case, the weighing hopper holding the products whose number is not smaller than the predetermined number is determined as the weighing hopper whose products should be recycled. By setting the predetermined number to an appropriate value, for example, a value (value that is twice as large as the target feed number) that is larger than the target feed number which is a number of the products which will be fed to the weighing hopper, the weighing hopper which is not selected for the discharge combination or the weighing hopper which is difficult to select for the discharge combination can be determined as the weighing hopper whose the products should be recycled. In this case, for example, the combination calculation means may be configured to calculate the number of products which are held in the weighing hopper based on the weight of the products which are held in the weighing hopper and a predetermined weight of one piece of product.

The combination calculation means may be configured to determine a discharge combination which is a combination of the weighing hoppers which hold the products whose total weight falls within a predetermined weight range and which hold the products whose total number is a target number. The recycle hopper determination means may be configured to determine that the predetermined recycle condition is such that the number of the products which are held in the weighing hopper is larger than the target number.

In this case, the weighing hopper which is fed with the products with an excess amount and is not selected for the discharge combination is determined as the weighing hopper whose products should be recycled. In this case, for example, the combination calculation means may be configured to calculate the number of products which are held in the weighing hopper based on the weight of the products which are held in the weighing hopper and a predetermined weight of one piece of product.

The predetermined recycle condition may be such that the weighing hopper is not selected for the discharge combination during a predetermined time period or longer.

In this case, the weighing hopper which is not selected for the discharge combination during the predetermined time period or longer is determined as the weighing hopper whose products should be recycled. By setting the predetermined time to an appropriate value, the weighing hopper which is not selected for the discharge combination or the weighing hopper which is difficult to select for the discharge combination can be determined as the weighing hopper whose products should be recycled.

The present invention has the above described configuration, and achieves an advantage that the combination weigher is capable of discharging products from a weighing hopper which is not selected for a discharge combination or from a weighing hopper which is difficult to select for the discharge combination without manual intervention and without reducing a productive capacity.

The above and further objects, features and advantages of the present invention will more fully be apparent from the following detailed description of preferred embodiments with accompanying drawings.

DETAILED DESCRIPTION OF THE PREFERRED EMBODIMENT

Hereinafter, an embodiment of the present invention will be described with reference to the drawings.

Figure 1:
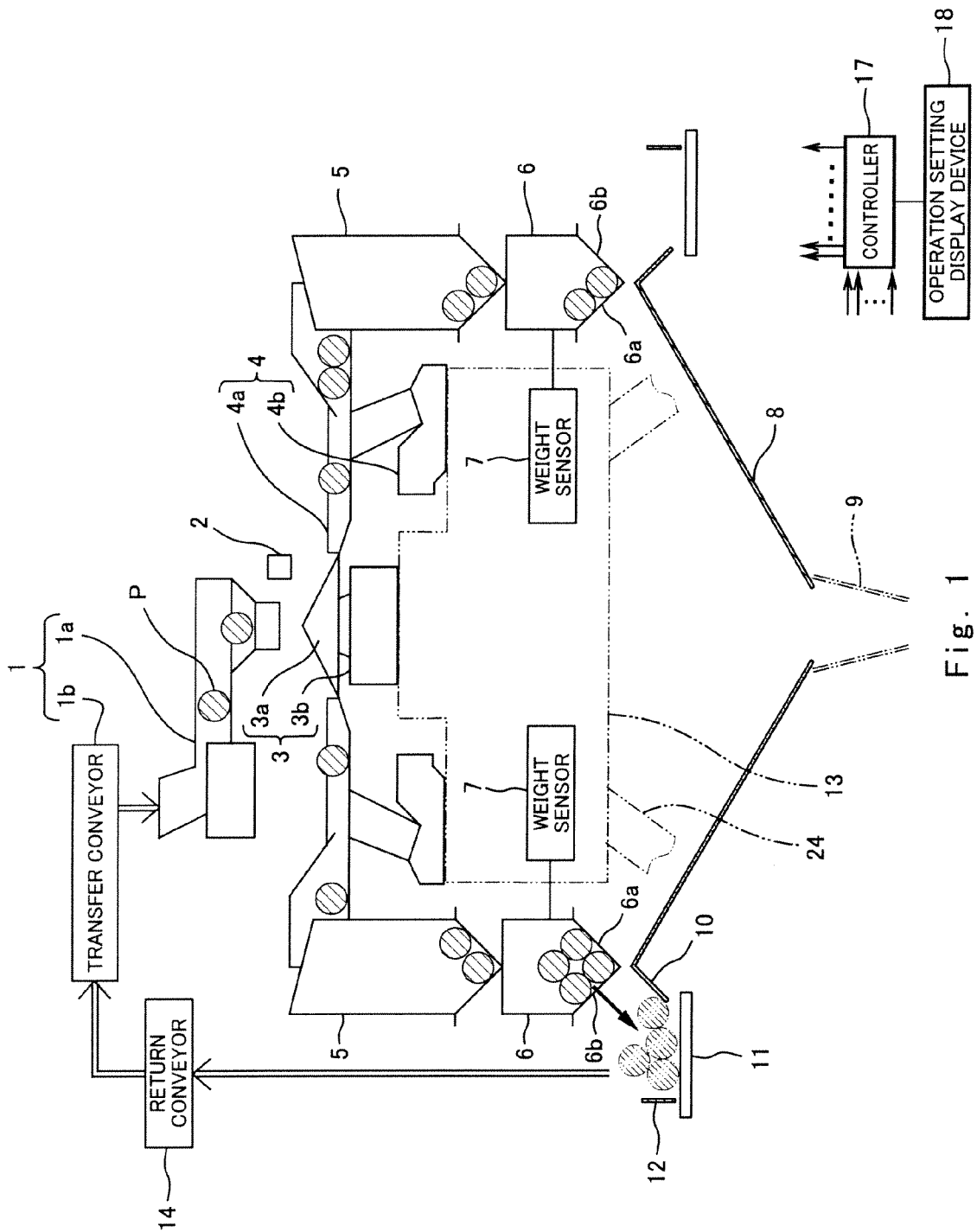
FIG. 1 is a schematic view showing a configuration of a combination weigher according to an embodiment of the present invention.
Figure 2:
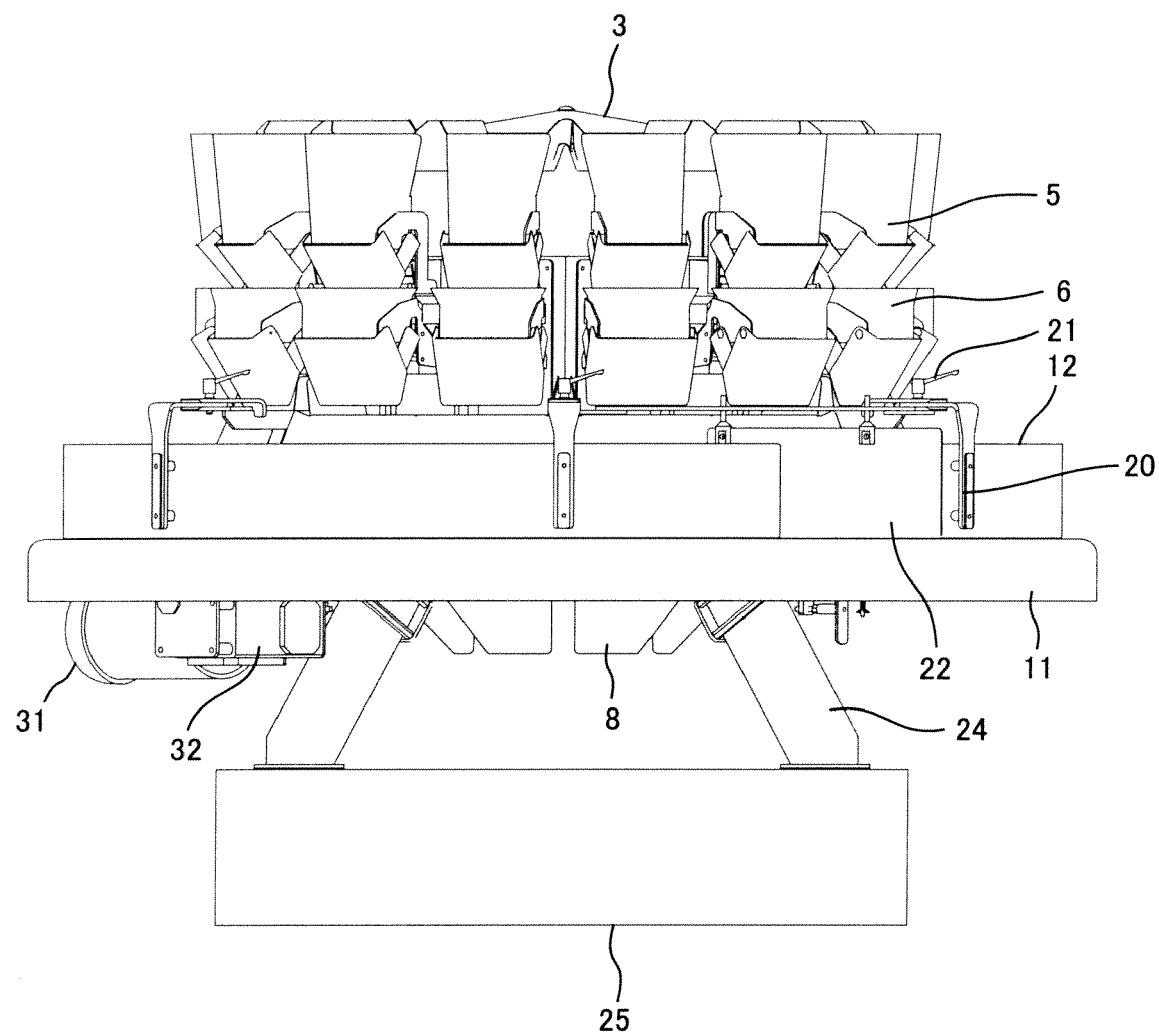
FIG. 2 is a front view showing a configuration of a major part of the combination weigher according to the embodiment of the present invention.
Figure 3:
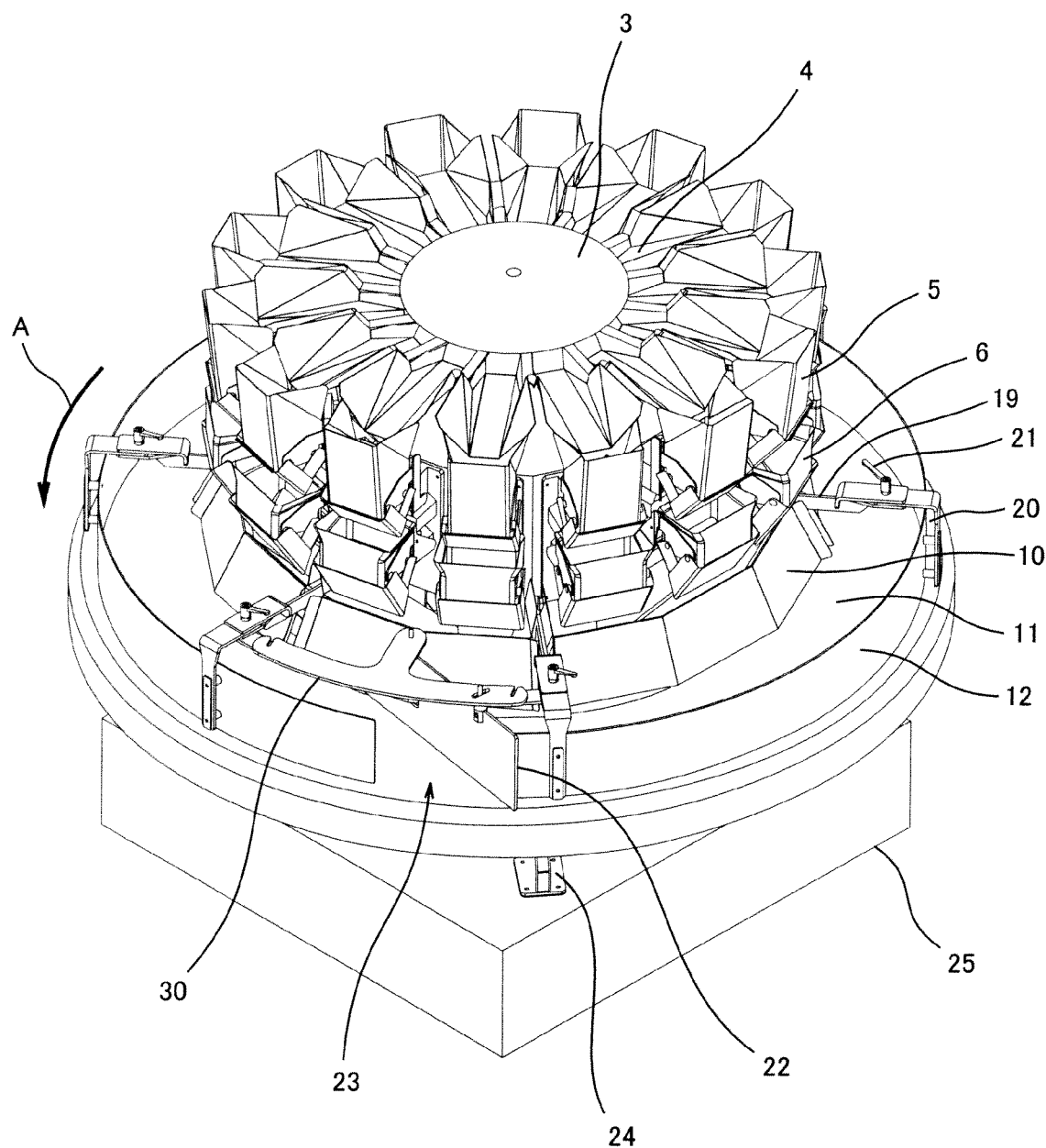
FIG. 3 is a perspective view showing a major part of the combination weigher according to the embodiment of the present invention, as viewed from above.
Figure 4:
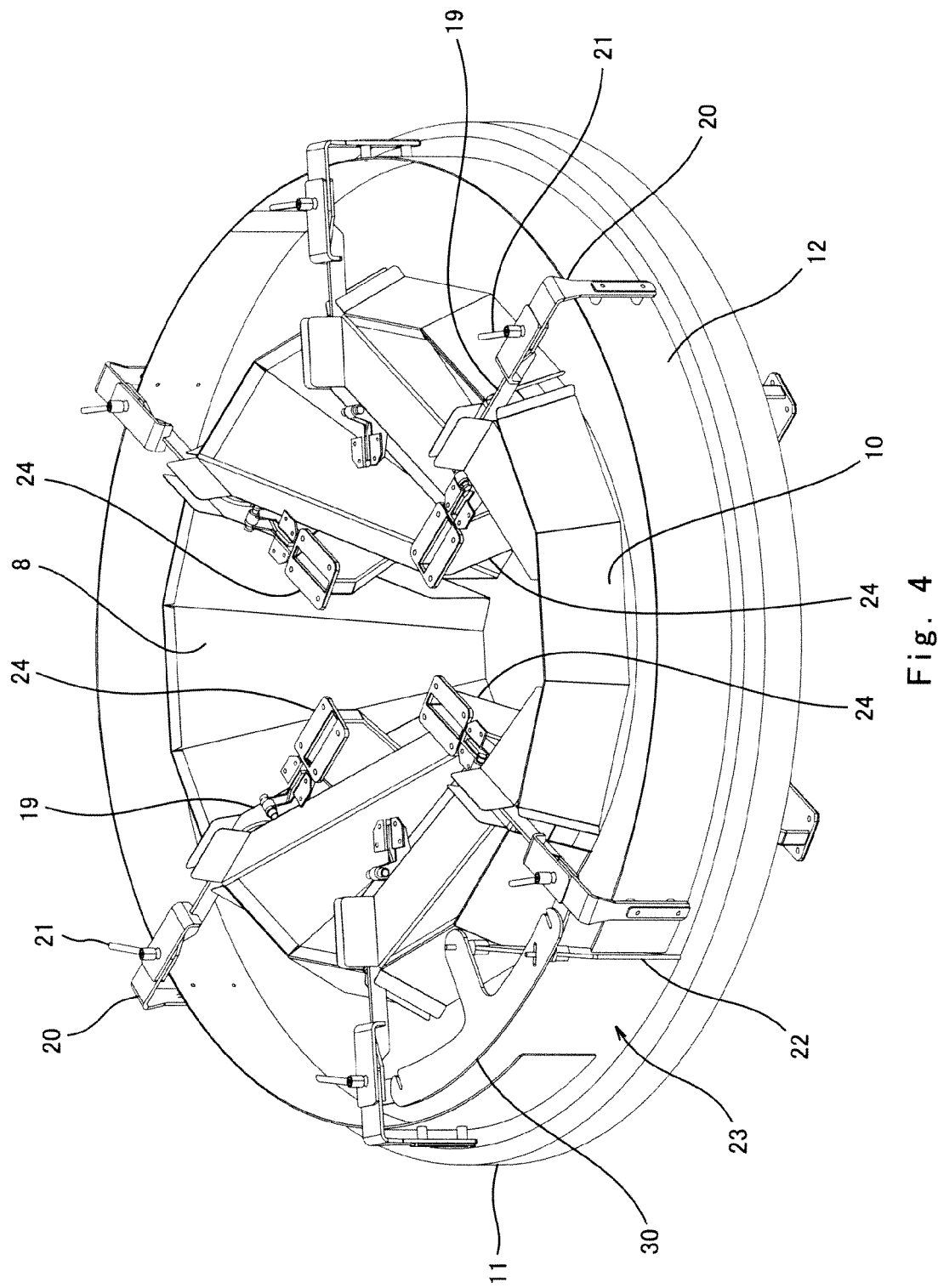
FIG. 4 is a perspective view showing a rotary table and a region in the vicinity of the rotary table in the combination weigher according to the embodiment of the present invention, as viewed from above.
Figure 5:
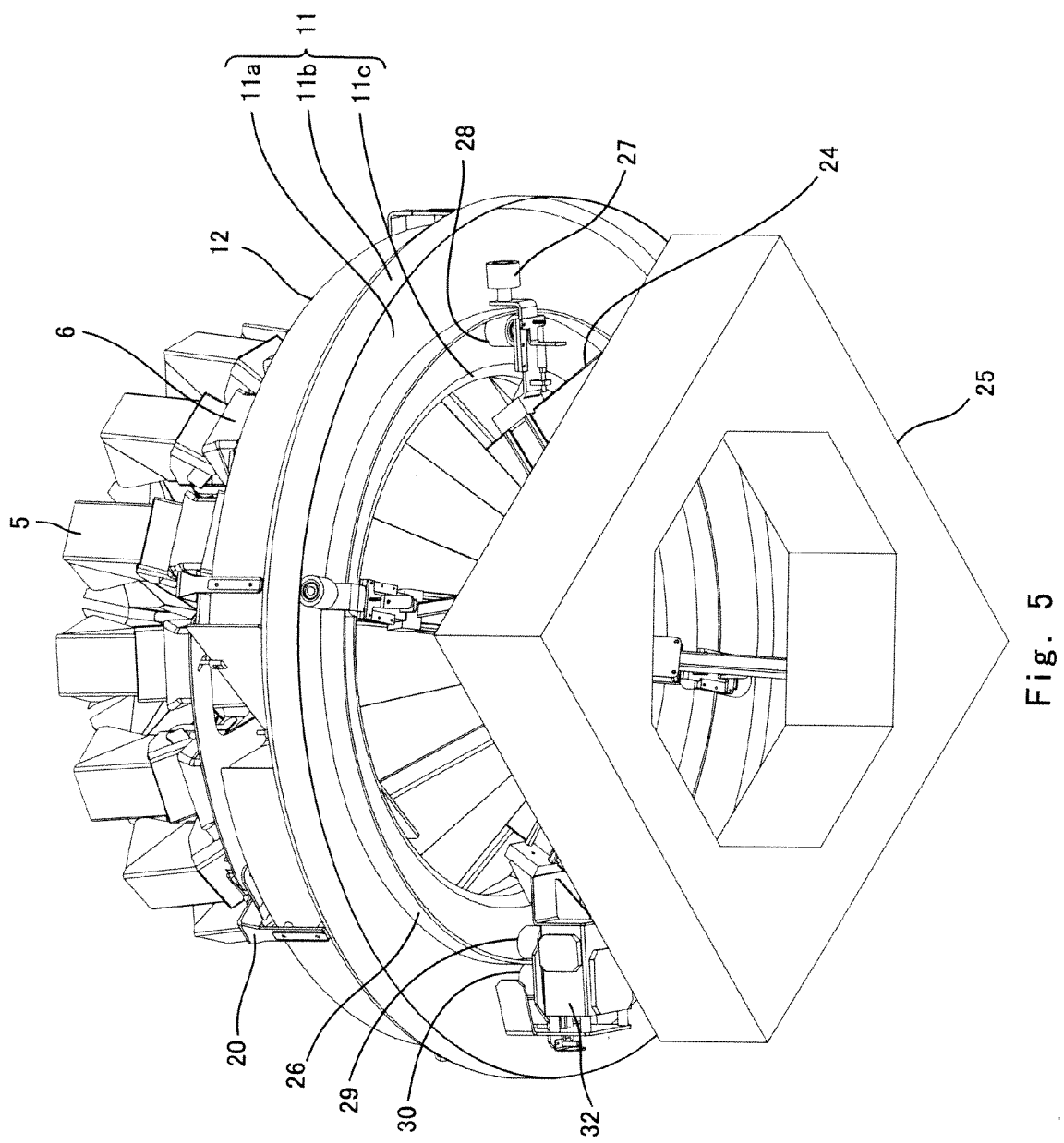
FIG. 5 is a perspective view showing a major part of the combination weigher according to the embodiment of the present invention, as viewed from below.
Figure 6:
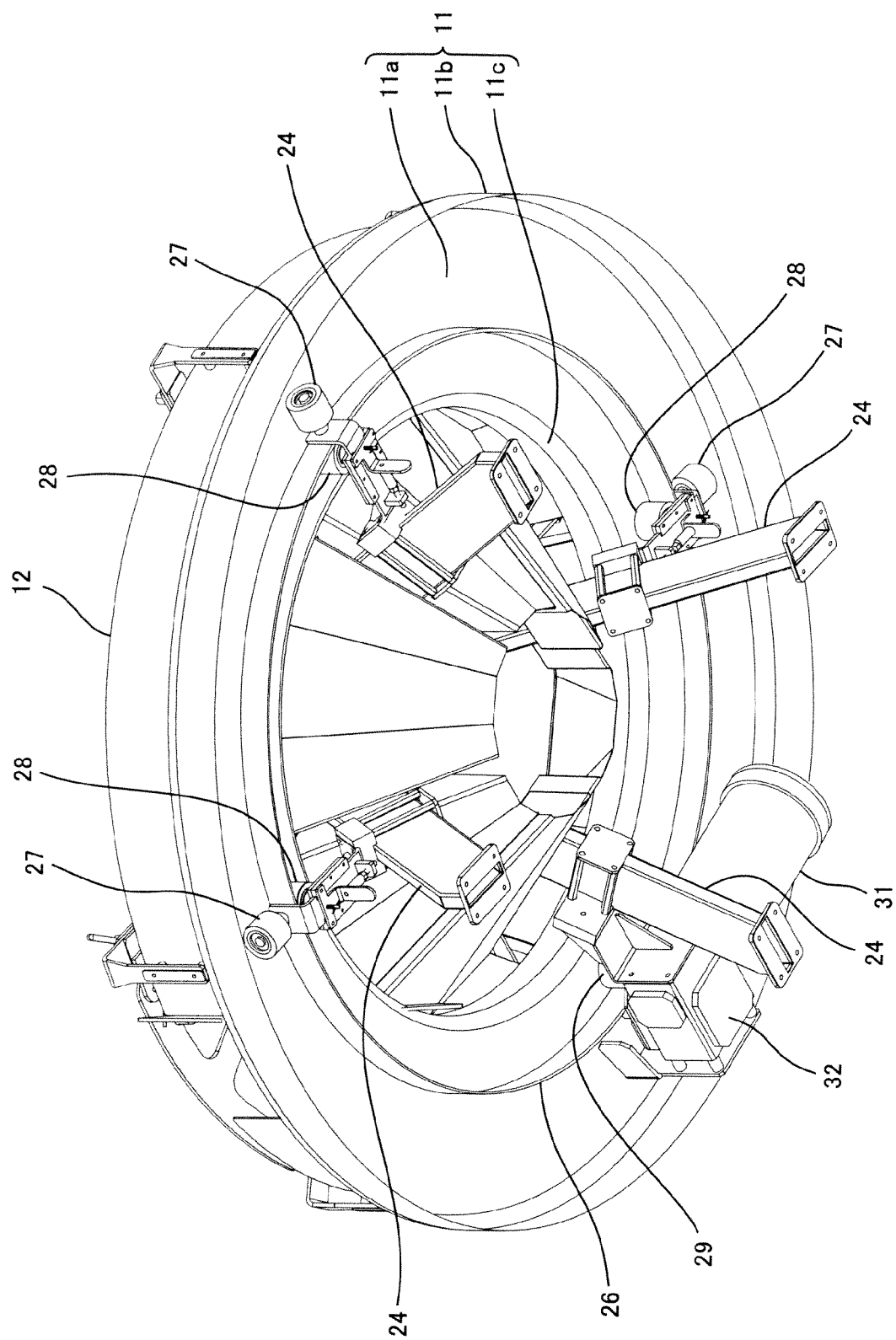
FIG. 6 is a perspective view showing a rotary table and a region in the vicinity of the rotary table in the combination weigher according to the embodiment of the present invention, as viewed from below.
Figure 7:
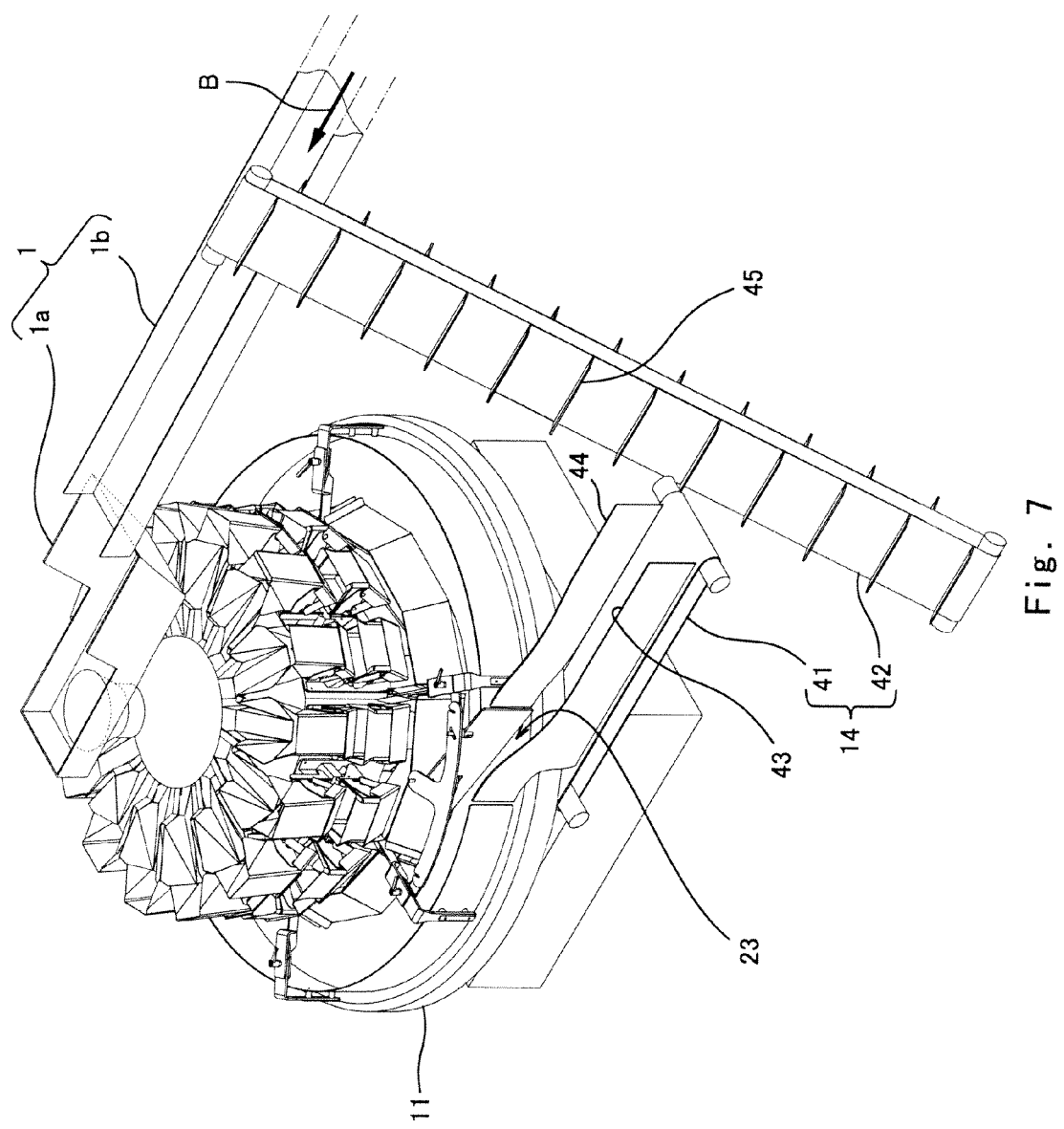
FIG. 7 is a perspective view showing an external appearance of the entire combination weigher according to the embodiment of the present invention.

FIG. 1 is a schematic view showing a configuration of a combination weigher according to an embodiment of the present invention. FIG. 2 is a front view showing a configuration of a major part of the combination weigher. FIG. 3 is a perspective view showing a major part of the combination weigher, as viewed from above. FIG. 4 is a perspective view showing a part of a major part of the combination weigher as viewed from above. FIG. 5 is a perspective view showing a major part of the combination weigher as viewed from below. FIG. 6 is a perspective view showing a part of a major part of the combination weigher as viewed from below. FIG. 7 is a perspective view showing an external appearance of the entire combination weigher.

The combination weigher of this embodiment includes a supplying device 1 constituted by a transfer conveyor 1b and a supplying feeder 1a. The transfer conveyor 1b is constituted by, for example, a vibration feeder, and vibrates to transfer to the supplying feeder 1a products which have been supplied by a means (not shown). The supplying feeder 1a is constituted by a trough having a discharge outlet and a vibrator for vibrating the trough. The supplying feeder 1a vibrates to discharge from a discharge outlet thereof to a center portion of a dispersion feeder 3, the products which have been transferred from the transfer conveyor 1b onto the trough. Below the supplying feeder 1a, the dispersion feeder 3 having a substantially conical shape is provided, and vibrates to radially disperse the products which have been fed from the supplying feeder 1a to a peripheral region thereof. The dispersion feeder 3 is constituted by a tray 3a having a substantially conical shape onto which the products are loaded, and a vibrator 3b for vibrating the tray 3a. Around the dispersion feeder 3, a plurality of linear feeders 4 are radially arranged and vibrate, to feed to feeding hoppers 5, the products which have been sent from the dispersion feeder 3. Each linear feeder 4 is constituted by a trough 4a onto which the products are loaded and a vibrator 4b for vibrating the trough 4a.

Below tip end portions of the linear feeders 4, the feeding hoppers 5 are provided. Below the feeding hoppers 5, weighing hoppers 6 are provided. The plurality of feeding hoppers 5 are arranged in a circular shape and the plurality of weighing hoppers 6 are arranged in a circular shape. The feeding hopper 5 receives the products which have been transferred from the linear feeder 4, and opens its gate to feed the products to the weighing hopper 6 positioned therebelow when the weighing hopper 6 is empty. Each weighing hopper 6 is attached with a weight sensor 7 such as a load cell for measuring the weight of the products inside the weighing hopper 6. Each weight sensor 7 outputs a measured value to a controller 17. Each weighing hopper 6 has an inner gate 6a for discharging the products in an inward direction and an outer gate 6b for discharging the products in an outward direction. When the inner gate 6a is opened, the products are discharged onto a collecting chute 8, while when the outer gate 6b is opened, the products are discharged onto a rotary table 11.

Below and inward of the weighing hoppers 4 arranged in a circular shape, the collecting chute 8 having a substantially inverted truncated conical shape is provided. Below the collecting chute 8, for example, a feed inlet (not shown) of a packaging machine is positioned. The products are discharged from a discharge outlet at a bottom part of the collecting chute 8 and are fed into the packaging machine to be charged into bags. For example, as shown in FIG. 2, the collecting chute 8 consists of divided plural parts which entirely form the substantially inverted truncated conical shape. As indicated by a dotted line in FIG. 1, a collecting funnel 9 may in some cases be disposed below the collecting chute 8. In this case, the collecting funnel 9 forms a part of the collecting chute. Below the collecting funnel 9, the feed inlet of the packaging machine is positioned. The products which have been discharged from the collecting chute 8 are fed to the packaging machine through the collecting funnel 9. In this embodiment, a case where the collecting funnel 9 is not provided will be described.

Above the dispersion feeder 3, a photoelectronic level sensor 2 is provided to detect the amount of the products on the dispersion feeder 3. A detection signal of the level sensor 2 is sent to the controller 17. The controller 17 controls the supplying feeder 1a based on the detection signal of the level sensor 2 so that the products on the dispersion feeder 3 are maintained at a specified amount.

A center base body 13 is substantially cylindrical. The dispersion feeder 3 and the linear feeders 4 are mounted to an upper portion of the center base body 13. The feeding hoppers 5 and the weighing hoppers 6 are mounted to a side surface of the center base body 13. Inside the center base body 13, drive units for the feeding hoppers 5, the weighing hoppers 6 and others (gate opening and closing devices for the feeding hoppers 5 and the weighing hoppers 6, etc), the weight sensors 7 for measuring the weights of the products inside the weighing hoppers 6, etc are accommodated. The center base body 13 is supported by four support legs 24 fastened to a ring-shaped platform 25 (see FIG. 5) having a hollow center portion. The platform 25 is fastened to, for example, a second floor, and a packaging machine is installed on an underlying first floor.

Below the weighing hoppers 6 and around the collecting chute 8, the rotary table 11 of a circular-ring shape is disposed to transport the products which have been discharged in the outward direction from the weighing hopper 6 and have been loaded onto the rotary table 11. Between the rotary table 11 and the weighing hoppers 6, an inner guide plate 10 which also serves as a chute is disposed so as not to contact the rotary table 11 and the weighing hoppers 6. The products which have been discharged in the outward direction from the weighing hopper 6 slide down on the inner guide plate 10 and are loaded onto the rotary table 11. The inner guide plate 10 is mounted to the collecting chute 8. In addition, an outer guide plate 12 is provided in the vicinity of an outer edge of the rotary table 11 except for an discharge outlet 23 (see FIG. 3). The outer guide plate 12 is provided to extend vertically with a small gap so as not to contact the rotary table 11.

The rotary table 11 is configured to rotate in a direction indicated by an arrow A in FIG. 3. A discharge guide plate 22 is provided as shown in FIG. 3 so that the products on the rotary table 11 are discharged from the discharge outlet 23 by the rotation of the rotary table 11. When the rotary table 11 rotates in the direction of the arrow A in FIG. 3, the products on the rotary table 11 move outward along the discharge guide plate 22 in the vicinity of the discharge outlet 23 and are discharged from the discharge outlet 23.

As shown in FIG. 4, the outer guide plate 12 is attached with a plurality of mounting members 20. A plurality of support members 19 are fastened to a lower surface of the center base body 13 (see FIG. 1). By rotating a mounting lever 21 attached to each support member 19, the mounting member 20 can be easily fastened to the support member 19, whereas by rotating the mounting lever 21 in an opposite direction, the mounting member 20 can be easily detached from the support member 19. The outer guide plate 12 is supported by fastening the mounting members 20 to the support members 19.

The discharge guide plate 22 is supported at an upper end thereof mounted to a member 30 mounted to the two support members 19 located in close proximity to the discharge outlet 23.

As shown in FIGS. 5 and 6, the rotary table 11 has a flat plate portion 11a of a circular-ring shape which is symmetric with respect to a vertical axis passing through the center of the circular shape in which the weighing hoppers 6 are arranged, an outer downward portion 11b extending downward from an outer edge portion of the flat plate portion 11a, and an inner downward portion 11c extending downward from an inner edge portion of the flat plate portion 11a. The flat plate portion 11a and the outward downward portion 11b are connected to each other by a rounded curved surface, while the flat plate portion 11a and the inner downward portion 11c are connected to each other by a rounded curved surface. The rotary table 11 is rotatable around the vertical axis as its rotational axis.

An annular driving plate 26 is mounted to a lower surface of the flat plate portion 11a of the circular-ring shape so as to be coaxial with the flat plate portion 11a by, for example, welding. The driving plate 26 is sandwiched between driving rollers 29 and 30 which are driven to rotate by a motor 31 via a rotation transmission mechanism 32. When the motor 31 operates, the driving rollers 29 and 30 rotate, causing the rotary table 11 attached with the driving plate 26 to rotate. The motor 31, the rotation transmission mechanism 32, and the driving rollers 29 and 30 are mounted to one support leg 24. It should be noted that only one of the rollers 29 and 30 may be a driving roller driven to rotate by the motor 31, and the other may be a rotatable support roller.

Rotatable support rollers 27 for supporting a lower surface of the flat plate portion 11a and rotatable support rollers 28 for supporting an inner surface of the driving plate 26 are provided. The support rollers 27 and 28 are provided in plural positions and are respectively fastened to the support legs 24 by fastener members.

The surface of the support roller 28 and the surfaces of the driving rollers 29 and 30 which are in contact with the driving plate 26 are covered with rubber, while the surface of the support roller 27 which is in contact with the flat plate portion 11a is covered with rubber.

As shown in FIG. 7, a return conveyor 14 includes, for example, two conveyors 41 and 42. The conveyor 41 is constituted by a belt conveyor and conveys the products which have been discharged from the discharge outlet 23 of the rotary table 11 in a horizontal direction to transfer them to the conveyor 42. The conveyor 41 is provided at both sides with guide plates 43 and 44 to inhibit the products which have been discharged from the discharge outlet 23 of the rotary table 11 from being rejected to the outside. The conveyor 42 is constituted by a belt conveyor with crosspieces which is provided with crosspieces 45 which are arranged to be spaced apart from each other. The conveyor 42 conveys obliquely upward the products which have been conveyed by the conveyor 41 to transfer them to the transfer conveyor 1b. The products which have been transferred from the conveyor 42 to the transfer conveyor 1b are allowed to get together with the products which are fed through a normal route in a transport direction indicated by an arrow B and are fed to the dispersion feeder 3 again. As the conveyor 42, a bucket conveyor having a structure in which a number of buckets are attached to an endless belt to be spaced apart from each other may be used. The return conveyor 14 and the feeding device 1 may have other structures and hence can be altered in various ways.

The controller 17 is constituted by, for example, a microcomputer. The controller 17 controls the entire combination weigher including the rotary table 11, the return conveyor 14, and the feeding device 1 and performs a combination process to determine a combination of weighing hoppers 6 which should discharge the products. In this combination process, combination calculation is performed based on measured values of the weighing hoppers 6 (weight values of the products inside the weighing hoppers 6 which are measured by the weight sensors 7), and one combination of weighing hoppers 6 in which a total of the measured values (a total of weights of the products) falls within an allowable range (predetermined weight range) with respect to a target combination weight and an absolute value of a difference between the total and the target combination weight is smallest is selected from among a plurality of weighing hoppers 6 and is determined as a combination (hereinafter referred to as "discharge combination") which should discharge the products. The controller 17 serves as not only a combination calculation means, a control means, and the like, but also a recycle hopper determination means which determines a recycle weighing hopper 6 as described later.

An operation setting display device 18 is configured to include, for example, a touch panel. The operating setting display device 18 includes an input means with which the operation of the combination weigher and the associated operating parameters are set, updated, etc, and a display means which displays on a screen, an operation speed, the combination weight value which is a total of the measured values of the weighing hoppers 6 selected to form the discharge combination, etc.

In FIG. 1, for convenience, the products P are illustrated as having a spherical shape. The products may have any other shapes including an intricate shape.

Subsequently, the operation of the combination weigher configured as described above will be described. The operation of the combination weigher is executed under control of the controller 17.

Initially, the products are transported by the feeding device 1 and are loaded onto the dispersion feeder 3. Then, the products are dispersed radially by the vibration of the dispersion feeder 3 and are transferred to each linear feeder 4. Then, the products are transferred by the vibration of each linear feeder 4 toward the tip end thereof. The products are discharged from the tip end of the linear feeder 4 and are fed to the feeding hopper 5. When the weighing hopper 6 located below each feeding hopper 5 is empty, the products are fed from the feeding hopper 5 to the weighing hopper 6. The controller 17 executes the above described combination process, and causes the weighing hoppers 6 selected to form the discharge combination to open the inner gates 6a to discharge the products onto the collecting chute 8. The products which have been discharged from the weighing hoppers 6 slide down on the collecting chute 8 and are fed to, for example, the feed inlet of the packaging machine. The above described operation is repeated.

Furthermore, in this embodiment, the controller 17 determines whether or not there is a weighing hopper 6 the measured value of which (weight value of the products inside the weighing hopper 6) is not smaller than a predetermined weight (Wa) and which is not selected for the discharge combination, every time it executes the combination process. If it is determined that there is such a weighing hopper 6, the controller 17 determines that the weighing hopper 6 is a hopper whose products should be recycled (hereinafter referred to as "recycle weighing hopper 6.") The controller 17 causes the recycle weighing hopper 6 to open the outer gate 6b to discharge the products, while driving the rotary table 11 and the return conveyor 14. The products which have been discharged from the recycle weighing hopper 6 slide down on the inner guide plate 10 and are loaded onto the rotary table 11. The products are transported in the direction as indicated by the arrow A in FIG. 3 and are discharged from the discharge outlet 23 of the rotary table 11 onto the return conveyor 14. Then, the products are fed from the return conveyor 14 to the feeding device 1 again.

The weighing hoppers 6 selected to form the discharge combination and the recycle weighing hopper 6 may discharge the products at the same time or otherwise at different timings.

The value of the predetermined weight Wa is stored in a memory of the controller 17. An operator can set or change the value of the predetermined weight Wa by operating the operation setting display device 18. The predetermined weight Wa may be set to, for example, a minimum value that is above an upper limit value in the allowable range with respect to the target combination weight. In this case, only a weighing hopper which is not selected for the discharge combination is selected as the recycle weighing hopper 6. Alternatively, the predetermined weight Wa may be set to a value that is not larger than the upper limit value of the allowable range with respect to the target combination weight and is significantly larger than a target feed amount for the weighing hopper 6. For example, the predetermined weight Wa may be set to a weight value that is twice as large as that of the target feed amount for the weighing hopper 6. Or, if the weight value that is ½ of the target combination weight is larger than the target feed amount for the weighing hopper 6, then the predetermined weight Wa may be set to the weight value that is ½ of the target combination weight. In this case, a weighing hopper which is difficult to select for the discharge combination, in addition to the weighing hopper which is not selected for discharge combination, are selected as the recycle weighing hopper 6.

In the combination process, the controller 17 may be configured to determine as the discharge combination, a combination of weighing hoppers 6 in which the total of measured values of the weighing hoppers 6 falls within the allowable rage with respect to the target combination weight and the total number of the products which are held therein is equal to a target number (N). In this case, the number of products which are held in each weighing hoppers 6 may be obtained by dividing the measured value of the weighing hopper 6 by a preset weight value (Ws) of one piece of product and rounding off fractional parts. In this case, in the manner described above, the controller 17 may be configured to determine as the recycle weighing hopper 6 a weighing hopper 6 having a measured value that is not smaller than the predetermined weight (Wa) and not being selected for the discharge combination, every time it executes the combination process. Alternatively, the controller 17 may be configured to determine as the recycle weighing hopper 6 a weighing hopper 6 holding the products whose number is not smaller than a predetermined number M and not being selected for the discharge combination, every time it executes the combination process. As used herein, the phrase that the weighing hopper 6 holds the products whose number is not smaller than a predetermined number M is substantially equivalent to the fact that the measured value of the weighing hopper 6 is not smaller than the predetermined weight Wa, when Wa=Ws×M. Ws indicates the preset weight value of one piece of product.

The value of the predetermined number M is stored in the memory in the controller 17. The operator can set or change the value of the predetermined number M by operating the operation setting display device 18.

When the predetermined number M is (N+1), only the weighing hopper which is not selected for the discharge combination is selected as the recycle weighing hopper 6. Alternatively, the predetermined number M may be set to a value that is not larger than the target number N and is significantly larger than a target feed number corresponding to the target feed amount for the weighing hopper 6. For example, the predetermined number M may be set to a number (number that is twice as large as the target feed number) corresponding to the weight value that is twice as large as the target feed amount for the weighing hopper 6. Or, if the weight value that is ½ of the target combination weight is larger than the target feed amount for the weighing hopper 6, then the predetermined number M may be set to a number corresponding to the weight value of ½ of the target combination weight. In this case, the weighing hopper which is difficult to select for the discharge combination in addition to the weighing hopper which is not selected for the discharge combination are selected as the recycle weighing hopper 6.

In this embodiment, the rotary table 11 is provided, the weighing hopper 6 is capable of selectively discharging the products in either one of the two directions, i.e., in the inward direction (toward the collecting chute 8) and in the outward direction (toward the rotary table 11), and the products can be discharged from the weighing hopper 6 which is not selected for the discharge combination onto the rotary table 11. Therefore, the products can be discharged from the weighing hopper 6 which is not selected for the discharge combination without manual intervention and without reducing a productive capacity. Or, the products can be discharged onto the rotary table 11 from the weighing hopper 6 which is difficult to select for the discharge combination, in addition to the weighing hopper 6 which is not selected for the discharge combination. Therefore, the products can be discharged from the weighing hopper 6 which is difficult to select for the discharge combination, and the weighing hopper 6 which is not selected for the discharge combination, without manual intervention and without reducing the productive capacity. Furthermore, the return conveyor 14 allows the products which have been discharged from the rotary table 11 to be fed again to the feeding device 1 without manual intervention.

The controller 17 is configured to, if there are plural recycle weighing hoppers 6 at the same time, cause all of these recycle weighing hoppers 6 to discharge the products at the same time. Since the products are discharged from all of the recycle weighing hoppers 6 at the same time, the control therefor is easy. In addition, since the rotary table 11 is disposed to extend along all of the weighing hoppers 6 and rotates, the products in the plural recycle weighing hoppers 6 are loaded in different locations onto the rotary table 11 in a dispersed manner and are transferred in a dispersed manner from the rotary table 11 to the transfer conveyor 1b through the return conveyor 14, even when the products are discharged from the plural recycle weighing hopper 6 at the same time. That is, since the products which are discharged from the plural recycle weighing hoppers 6 at the same time can be fed in a dispersed manner to the transfer conveyor 1b again, it is possible to suppress occurrence of an event that the products stick together on the transfer conveyor 1b, the supplying feeder 1a, the dispersion feeder 3, or the linear feeder 4 and hence a large amount of the products in a sticky state are fed to the weighing hopper 6.

Alternatively, a weighing hopper 6 which is not selected for the discharge combination during a predetermined time (t1) or longer may be selected as the recycle weighing hopper 6. In this case, by setting the predetermined time t1 to an appropriate value, the products which are held in the weighing hopper 6 which is not selected for the discharge combination or the weighing hopper 6 which is difficult to select for the discharge combination can be discharged from these weighing hoppers 6 onto the rotary table 11. In this case, the value of the predetermined time t1 is stored in the memory of the controller 17. The operator can set and change the value of the predetermined time t1 by operating the operation setting display device 18.

The controller 17 is not limited to being configured as the single control apparatus, but instead may be configured to include a plurality of control apparatuses which are disposed in a distributed manner and co-operate to control the operation of the combination weigher.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A combination weigher comprising:
    a plurality of weighing hoppers which are arranged in a circular shape and are each configured to hold products, and then to discharge the products selectively in an inward direction of the circular shape or in an outward direction of the circular shape, the weighing hoppers being each configured to measure weight of the products which are held therein;
    a collecting chute which is positioned below the weighing hoppers, the collecting chute being configured to collect the products which have been discharged from the weighing hopper in the inward direction and to discharge the products from a discharge outlet at a bottom part thereof;
    a recycle conveyor which is positioned below the weighing hoppers so as to surround the collecting chute, the recycle conveyor being configured to convey, in one direction around the collecting chute, the products which have been discharged from the weighing hopper in the outward direction and have been loaded onto the recycle conveyor;
    a discharge means which is configured to discharge the products on the recycle conveyor in a predetermined position from the recycle conveyor;
    a combination calculation means which is configured to determine a discharge combination which is a combination of weighing hoppers holding the products whose total weight falls within a predetermined weight range;
    a recycle hopper determination means configured to determine a weighing hopper whose products should be recycled, based on a predetermined recycle condition; and
    a control means configured to cause the weighing hoppers selected to form the discharge combination to discharge the products in the inward direction, and to cause the weighing hopper determined by the recycle hopper determination means to discharge the products in the outward direction, and
    wherein the recycle conveyor includes an annular rotary table onto which the products are loaded, the rotary table being rotatable around a vertical axis extending through a center of the circular shape in which the weighing hoppers are arranged; and
    wherein the discharge means includes a guide plate which guides, to outside the rotary table, the products on the rotary table which is rotating.

2. The combination weigher according to claim 1, further comprising:
    a dispersion feeder configured to disperse the products which have been supplied to a center portion thereof toward a peripheral edge thereof;
    a plurality of linear feeders which are arranged radially around the dispersion feeder, the linear feeders being each configured to convey, in a direction away from the dispersion feeder, the products which have been fed from the dispersion feeder, and to discharge the products;
    a plurality of feeding hoppers which are arranged in a circular shape above the weighing hoppers, and are configured to hold the products which have been discharged from the linear feeders and to then feed the products to the weighing hoppers; and
    a transport means of the products which is configured to feed, to the dispersion feeder, the products which have been discharged from the recycle conveyor by the discharge means.

3. The combination weigher according to claim 1, further comprising:
    an inner guide plate which is configured to guide, to an inner edge portion of the rotary table, the products which have been discharged from the weighing hoppers in the outward direction.

4. The combination weigher according to claim 1, further comprising:
    an outer guide plate provided to extend along an outer edge portion of the rotary table.

5. The combination weigher according to claim 1, wherein the predetermined recycle condition is such that a weight of the products which are held in the weighing hopper has a predetermined weight value or larger which is larger than a target feed amount for the weighing hopper.

6. The combination weigher according to claim 1, wherein the predetermined recycle condition is such that a weight of the products which are held in the weighing hopper has a value that is larger than an upper limit value in the predetermined weight range.

7. The combination weigher according to claim 1, wherein the combination calculation means is configured to determine a discharge combination which is a combination of the weighing hoppers which hold the products whose total weight falls within a predetermined weight range and whose total number is a target number; and
    wherein the recycle hopper determination means is configured to determine that the predetermined recycle condition is such that the number of the products which are held in the weighing hopper is a predetermined number or larger.

8. The combination weigher according to claim 1, wherein the combination calculation means is configured to determine a discharge combination which is a combination of the weighing hoppers which hold the products whose total weight falls within a predetermined weight range and which hold the products whose total number is a target number; and wherein the recycle hopper determination means is configured to determine that the predetermined recycle condition is such that the number of the products which are held in the weighing hopper is larger than the target number.

9. The combination weigher according to claim 1, wherein
the predetermined recycle condition is such that the weighing hopper is not selected for the discharge combination during a predetermined time period or longer.

* * * * *